Dec. 8, 1931.  M. KIPPERMAN  1,835,604

SANDING AND FINISHING DEVICE

Filed Feb. 20, 1928  2 Sheets-Sheet 1

M. KIPPERMAN  INVENTOR

BY Merrill M. Blackburn
ATTORNEY

Dec. 8, 1931.  M. KIPPERMAN  1,835,604
SANDING AND FINISHING DEVICE
Filed Feb. 20, 1928   2 Sheets-Sheet 2

M. KIPPERMAN  INVENTOR

BY Merrill M. Blackburn
ATTORNEY

Patented Dec. 8, 1931

1,835,604

UNITED STATES PATENT OFFICE

MENDEL KIPPERMAN, OF DAVENPORT, IOWA

SANDING AND FINISHING DEVICE

Application filed February 20, 1928. Serial No. 255,586.

My present invention pertains to a tool for attachment to a power machine such as is already old and well-known on the market and is designed to be an improvement on the various styles of tools used for the purpose stated, being originally designed for use with a shoe machine but being as well adapted for use with other types of mechanisms.

Among the objects of this invention are to provide a tool of the character indicated which can be readily attached to and detached from a rotary shaft; to provide a tool of the character indicated to which sandpaper or equivalent like material may be attached and securely held in place; to provide an improved means for securing sandpaper or like material in place on a tool of the character indicated; to provide an improved tool such that the abradant may be easily applied and rigidly secured in place; to provide a tool of the character indicated which may be either attached to a shaft or held in a chuck and can be readily changed from one form to the other in a minimum of time and with a minimum of labor; to provide an improved means for tightening the abradant material upon the face of a tool of the character indicated; to provide means in a tool of the character indicated making it possible to easily secure the abradant in place on the tool or release it for removal therefrom; and such further objects, advantages and capabilities as will hereafter appear and as are inherent in the construction disclosed herein. My invention further resides in the combination, construction and arrangement of parts illustrated in the accompanying drawings and, while I have shown therein what is now considered the preferred embodiment of this invention, together with a modification thereof, I desire it understood that the present disclosure is to be construed as illustrative only and not in a limiting sense.

Figure 1:
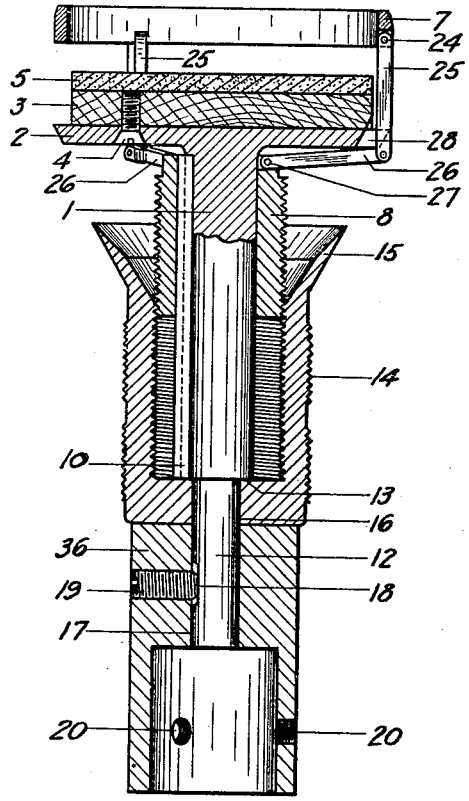
Figure 2:
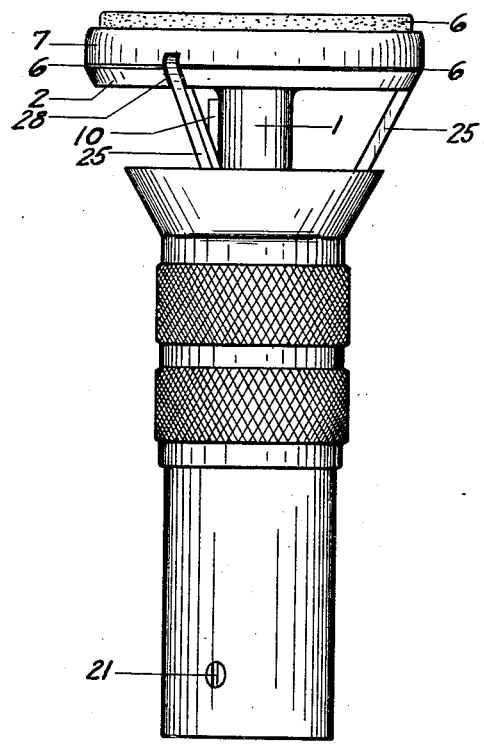
Figure 3:
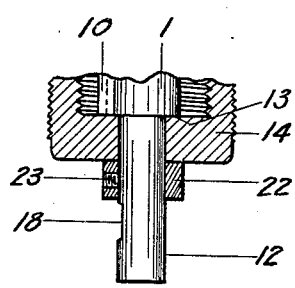
Figure 8:
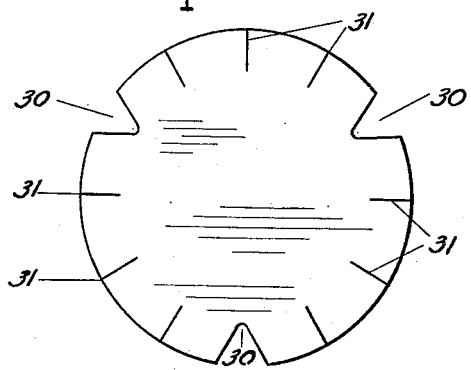
Figure 4:
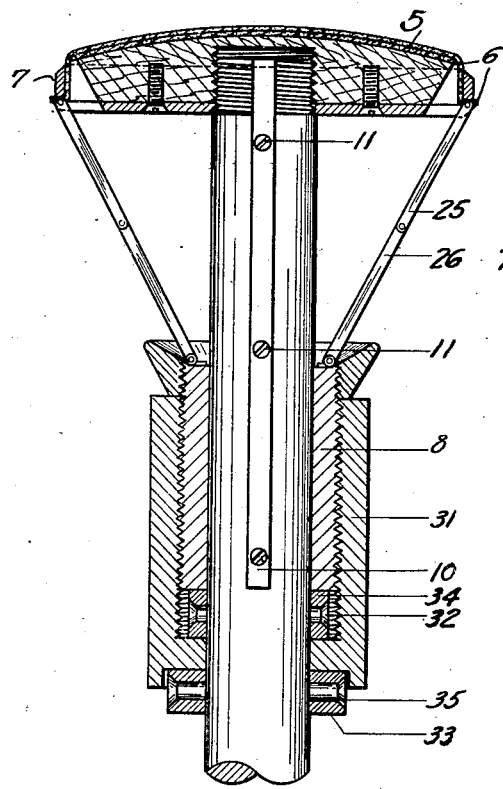
Figure 5:
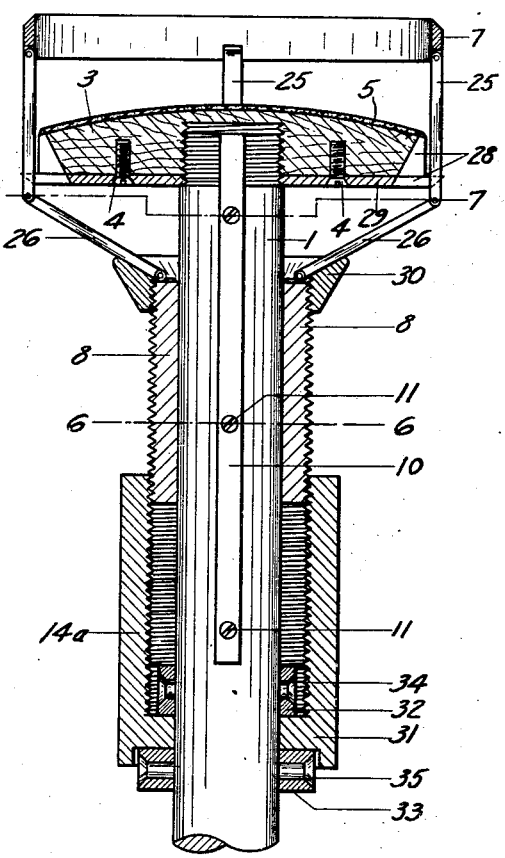
Figure 6:
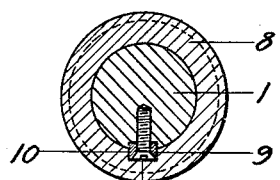
Figure 7:
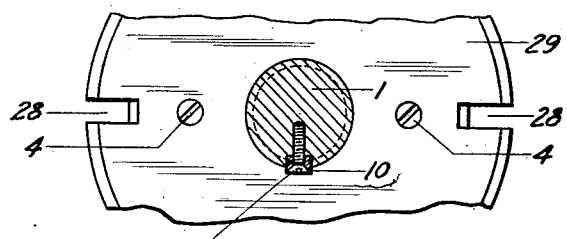

In the drawings annexed hereto and forming a part hereof, Fig. 1 is a longitudinal section of a tool constructed in accordance with my present invention, the same being shown opened for the reception of the abradant material; Fig. 2 is an elevation of the tool shown in section in Fig. 1 but closed up and holding the sandpaper or other abradant in position on the head; Fig. 3 is a fragmentary view of one portion of the structure shown in Figs. 1 and 2, modified slightly for use in connection with a chuck; Fig. 4 is a longitudinal section of a modified form of the invention shown in Figs. 1, 2 and 3; Fig. 5 is a view similar to Fig. 4 but showing the parts in opened position to permit sandpaper or like abradant to be inserted or withdrawn from the head of the tool; Fig. 6 is a transverse section through the device substantially along the plane indicated by the line 6—6, Fig. 5; Fig. 7 is a fragmentary view of the under face of the head taken substantially along the plane indicated by the line 7—7, Fig. 5, but with the actuating arms omitted; Fig. 8 is a plan view of a sheet, ready to be formed and then have abradant material applied thereto.

Referring more in detail to these drawings, numeral 1 denotes a supporting shank or shaft upon which is formed a head 2. Upon the forward face of this head is mounted a plate 3 which is secured in place by means of a plurality of screws 4. Upon the forward face of this plate 3 there is secured a pad 5 of somewhat resilient material, such as felt or the like. This serves as a somewhat soft and resilient backing for the sandpaper or like material 6 which is stretched over the face of the tool and drawn downwardly by the ring 7 until it is tight.

Slidably mounted upon the shaft or shank 1 is an externally screw-threaded sleeve 8 which is provided with an interior groove 9 for the reception of a key 10 set into a groove in the shank 1 and secured therein by means of a plurality of screws 11. A single key, feather or spline, as indicated, is sufficient to prevent rotation of the sleeve 8. At its rearward end the shank 1 is reduced as indicated at 12, a shoulder 13 being formed between the two parts. An internally threaded cup shaped member 14 having an outwardly flaring flange 15 is perforated at its bottom as indicated at 16 and through this perforation extends the reduced portion 12 of the shank. The internal screw threads of this cup cooperate with the external screw threads of the sleeve 8 to move that sleeve longitudinally along the shank 1. Another cup shaped member 36 has its bottom perforated as indicated at 17 and through this perforation, also, passes the reduced portion 12. This latter has its surface flattened upon one side as indicated at 18 for engagement by a set screw 19 which serves to prevent relative rotation between the cup 36 and the shank 1. Screw threaded openings 20 extend through the wall of the cup and receive suitable set screws 21 for securing the tool to a rotatable shaft by means of which this device is driven. If it is desired to use this with a chuck instead of securing it upon a shaft as indicated in Figs. 1 and 2, the cup 36 is removed from the portion 12 and a collar 22 is substituted therefor, the same being secured in place by means of a set screw 23. This device may then be mounted in a chuck or connected to a flexible shaft in the customary manner of mounting tools.

Pivoted at 24 to the ring 7 are links 25 which serve to push the ring away from the head or draw the same into position thereon. Pivotally connected to the links 25 are other links 26 which also have pivotal connection at 27 with the forward end of sleeve 8. Slots having inclined bottoms are formed in the forward end of the sleeve 8 for the reception of the inner ends of links 26. The bottoms of these slots are so inclined as to prevent the links 26 from turning on pivots 27 beyond a certain point, as illustrated in Fig. 1. Slots 28 are formed in the edge of the head 2 for the reception of the links 25. These serve to guide the links in their reciprocating motion and assist in preventing relative rotation of the ring and head. When the cup 14 is screwed upon the sleeve 8 the links 26 are drawn downwardly and the hinge joints are straightened out. If a piece of sandpaper 6 or like abradant material has been placed upon the face of the head underneath the ring 7 then, as the ring is drawn downwardly by turning the cup 14 about the shank 1, the ring will draw the sandpaper taut and hold the same tightly in place on the head so that there will be no looseness or puffiness upon the face of the head. If there be surplus material projecting beyond the edge of the head, the edge of this material may be cut off along the edge of the head by any suitable knife. If it be desired to remove the abradant material from the head, it is only necessary to turn the cup 14 in the opposite direction from that in which it was turned before and the ring will be shoved away from the head as indicated in Fig. 1, permitting the abradant to be removed from the head.

The structure shown on Sheet 2 is in many ways similar to that shown on Sheet 1 but there are certain differences in this construction. For example, the head 29 differs from the head 2 in that it is not integral with the shank 1 but is screw-threaded thereon as illustrated and is then secured in place by sliding the key or spline 10 into the keyway provided in the shank and plate 29, and then securing the spline in place by means of the screws 11. While the block 3 is shown as having a somewhat different shape from that shown in Figs. 1 and 2, the function is the same and it is secured to the plate 29 by screws 4 as previously described in connection with the other form. To the forward face of this block is secured a padding material 5 as described above. Slots 28 are similar to those in the other form and perform the same function. Also, links 25 and 26 operate as in the construction described above. However, instead of the flange 15 on the cup 14 there is provided a ring 30 having a flaring opening to support the links 26 as illustrated clearly in Fig. 5. These links 26 are hinged to the externally screw-threaded sleeve 8 in a slightly different manner from that described above but the purpose and result are the same.

To prevent longitudinal motion of the cup 31 corresponding to cup 14, rings 34 and 33 are secured in place internally and externally of the cup by means of screws 32 and 35. As will be readily understood, these rings will hold the cup from longitudinal motion in either direction and will therefore force the sleeve 8 to reciprocate on the shank. This device may be arranged to be secured on a shaft or in a chuck as with the construction previously described.

It will be understood that most of the alternative elements of structure shown in the two modifications are interchangeable and it is therefore not intended that this invention be limited to any particular combination of elements except as required by the claims.

In Fig. 8 is shown an abradant element for use with the construction shown in either form of device illustrated. It is preferred in making this abradant or polishing element to cut out substantially circular disks from a sheet of material such as sand paper, polishing cloth, emery cloth, or like material for sanding and polishing and form notches 30 in the edge thereof at substantially equal distances apart for the reception of the links 25 when the ring 7 is drawn downwardly about the head 3. In addition to these notches 30, there are incisions 31, spaced around the disk intermediate the notches 30. These incisions are to assist in drawing the flexible sheet down around the head of the tool. When this sheet is cut into the form shown in this figure, it can be easily inserted inside the ring and shoved down substantially to place. The ring 7 is then drawn down until the edge of the sheet is clamped between the ring 7 and the edge of the plate 29. After this, any surplus material may be trimmed off around the outside of the ring 7, if desired, and the device is ready for use. Of course it is not necessary to trim off this surplus material if the projecting edge will not be in the way and there will be no risk of this protruding abradant coming in contact with the work.

It is contemplated that in some instances it may be desirable to extend the flange 15 of the structures shown in Figs. 1 and 2 up to the plane of the under side of the head 2 so as to enclose the links 25 within this flange, except so far as these links may be within the contour of the head 2 and ring 7. Doing this, would necessitate forming slots in the edge of the head 2 so that the links 26 would be forced upwardly into such slots by the flange 15 when the ring 7 is raised into the position shown in Fig. 1. When the ring 7 is drawn downwardly into the position shown in Fig. 2, the links 25 and 26 will form a substantially straight line. When constructing the device in this way, the links 25 may be made somewhat shorter or may be relatively of substantially the proportions given. In the former event, the ring 7 would not be pushed any farther away from the head 2 than with the construction now illustrated. On the contrary, in the latter event, the ring would be pushed further away. These changes, as suggested in this paragraph, are considered merely as modifications coming within the scope of the claims of this application and not a sufficient basis for the allowance of additional claims.

It will be understood from the foregoing that this device is useful not only in holding abradant sheets but also soft material for polishing and finishing.

It is believed that the operation of this device has been sufficiently indicated above so that further statement thereof will be unnecessary. However, it is desired to emphasize the fact that with this construction the abradant material, in the form of sheets, is drawn tightly down about the head and held in position thereon so that there is not the customary looseness and bagginess so common with tools of this class.

While this tool has been disclosed as being constructed primarily for use with shoe machinery, it will of course be understood that it has various other uses such as in sanding certain parts in automobile finishing and certain constructions in woodworking. It is therefore understood that I do not wish to be limited to the particular uses set forth above. It is also understood that the specific description of structure set forth above may be departed from without departing from the spirit of my invention as set forth in this specification and the appended claims.

Having now described my invention, I claim:

1. In a tool of the character described, a shank, a head thereon having a forward face extending transversely of the axis of the shank, a sleeve slidable on the shank, means on the shank for moving the sleeve lengthwise thereof, means preventing relative rotation of the sleeve and shank, and means pivotally connected with said sleeve to cooperate therewith in causing tightening of an abradant material upon the said forward face of the head.

2. In a tool of the character described, a shank having a head thereon, a sleeve nonrotatably but slidably mounted upon the shank, a cup rotatably but non-slidably mounted upon the shank, connections between the cup and sleeve whereby rotation of the former will cause sliding of the latter, and means connected with the sleeve to act upon an abradant sheet placed upon the forward face of the head to draw said abradant tightly upon said forward face.

3. In a device of the character indicated, a shank having a head thereon, a key extending longitudinally of the shank, a sleeve sliding on said shank but prevented from rotation relative thereto by the key, a cup surrounding the shank, means for preventing the cup from sliding relatively to the shank, links pivotally connected to the sleeve, means in connection with the sleeve for limiting the amount of pivotal motion of the links with relation to the sleeve, a ring adjacent the head, and links connecting the first named links with the ring to cause longitudinal movement thereof when the cup is rotated relatively to the shank.

4. In a holder for abradant sheets, a shank, a spline secured thereto, a head on the shank, a sleeve sliding on the shank and prevented from rotation thereon by the spline, a ring adapted to peripherally surround the head, links connecting the sleeve and ring, and means to actuate the sleeve and ring longitudinally of the shank.

5. In a holder for abradant sheets, a shank, a spline secured thereto, a head on the shank, a sleeve sliding on the shank and prevented from rotation thereon by the spline, a ring adapted to peripherally surround the head, links connecting the sleeve and ring, and a cup rotatably and non-slidably mounted on the shank to actuate the sleeve and ring longitudinally of the shank.

6. In a tool of the character described, a shank having a head thereon, a sleeve nonrotatably but slidably mounted upon the shank, a cup rotatably but non-slidably mounted upon the shank, connections between the cup and sleeve whereby rotation of the former will cause sliding of the latter, and means connected with the sleeve to act upon an abradant sheet placed upon the forward face of the head to draw said abradant tightly upon said forward face, including flaring means having adjustable relationship to the first named sleeve.

7. In a holder for abradant sheets, a shank, a spline secured thereto, a head on the shank, a sleeve sliding on the shank and prevented from rotation thereon by the spline, a ring adapted to peripherally surround the head, links connecting the sleeve and ring, flared means engaging said links to limit the rotation thereof about their pivots.

8. In a holder for abradant sheets, a shank, a key secured thereto, a head on the shank, a ring of slightly larger internal diameter than the external diameter of the head and adapted to surround the same, a sleeve surrounding the shank and held from turning relatively thereto by the key, and means connecting the sleeve and ring and serving to transmit motion from the former to the latter to bring the ring into or out of surrounding position with relation to the head.

9. In a holder for abradant sheets, a shank, a key secured thereto, a head on the shank, a ring of slightly larger internal diameter than the external diameter of the head and adapted to surround the same, a sleeve surrounding the shank and held for turning relatively thereto by the key, means connecting the sleeve and ring and serving to transmit motion from the former to the latter to bring the ring into or out of surrounding position with relation to the head, and means to move the sleeve longitudinally of the shank or hold them in relatively fixed position.

10. In a holder for abradant sheets, a shaft, a head thereon, a ring of a slightly larger size than the head so that it may surround the head and hold abradant material clamped between itself and the head, and jointed links connected to the ring and movable means connected to the links and shaft to transmit motion to the ring whereby to cause tightening and loosening of the abradant material.

11. In a holder for abradant sheets, a shaft, a head thereon, a flangeless ring of a slightly larger size than the head so that it may surround the head and hold abradant material clamped between itself and the head, means on the head to limit the inward motion of the ring, and folding link means for drawing the ring into clamping position.

12. In a holder for abradant sheets, a shaft, a head thereon, a plain ring of a slightly larger size than the head so that it may surround the head and hold abradant material clamped between itself and the head, a projection on the head to limit the inward motion of the ring, and means, including links, connecting the ring and shaft to draw the ring into clamping position.

In witness whereof, I hereunto subscribe my name to this specification.

MENDEL KIPPERMAN.